Feb. 10, 1953  T. S. SKILLMAN  2,627,941
STOCK DISTRIBUTING SYSTEM
Filed Jan. 28, 1946  5 Sheets-Sheet 1

Inventor:
Thomas S. Skillman
By Ward, Crosby & Neal
Attorneys.

Feb. 10, 1953 — T. S. SKILLMAN — 2,627,941
STOCK DISTRIBUTING SYSTEM
Filed Jan. 28, 1946 — 5 Sheets-Sheet 2

Inventor:
Thomas S. Skillman
By Ward, Crosby & Neal
Attorneys

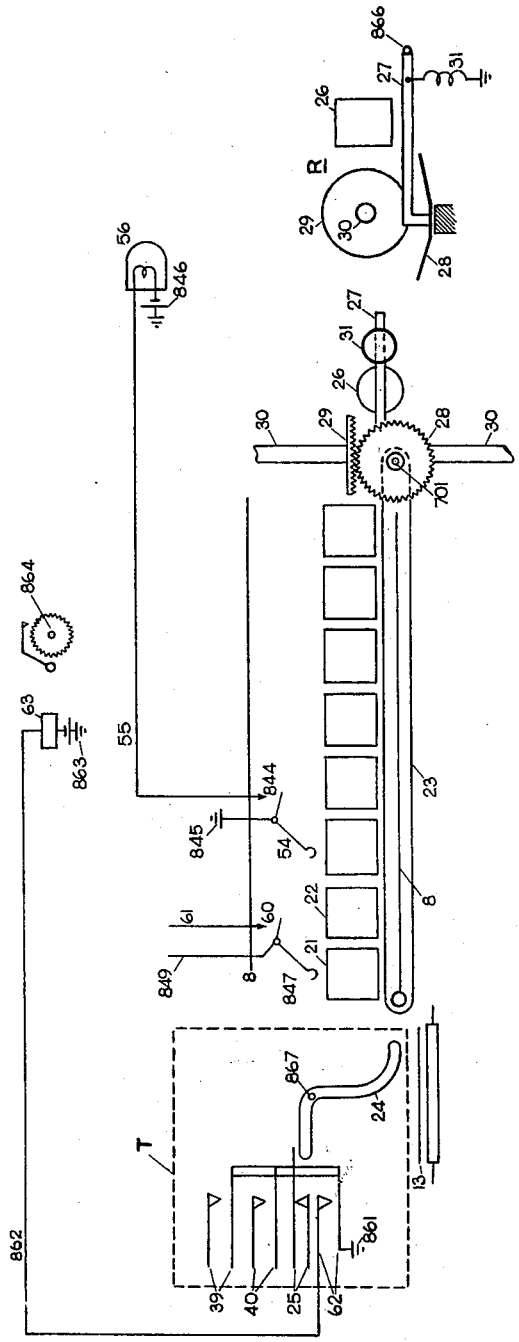

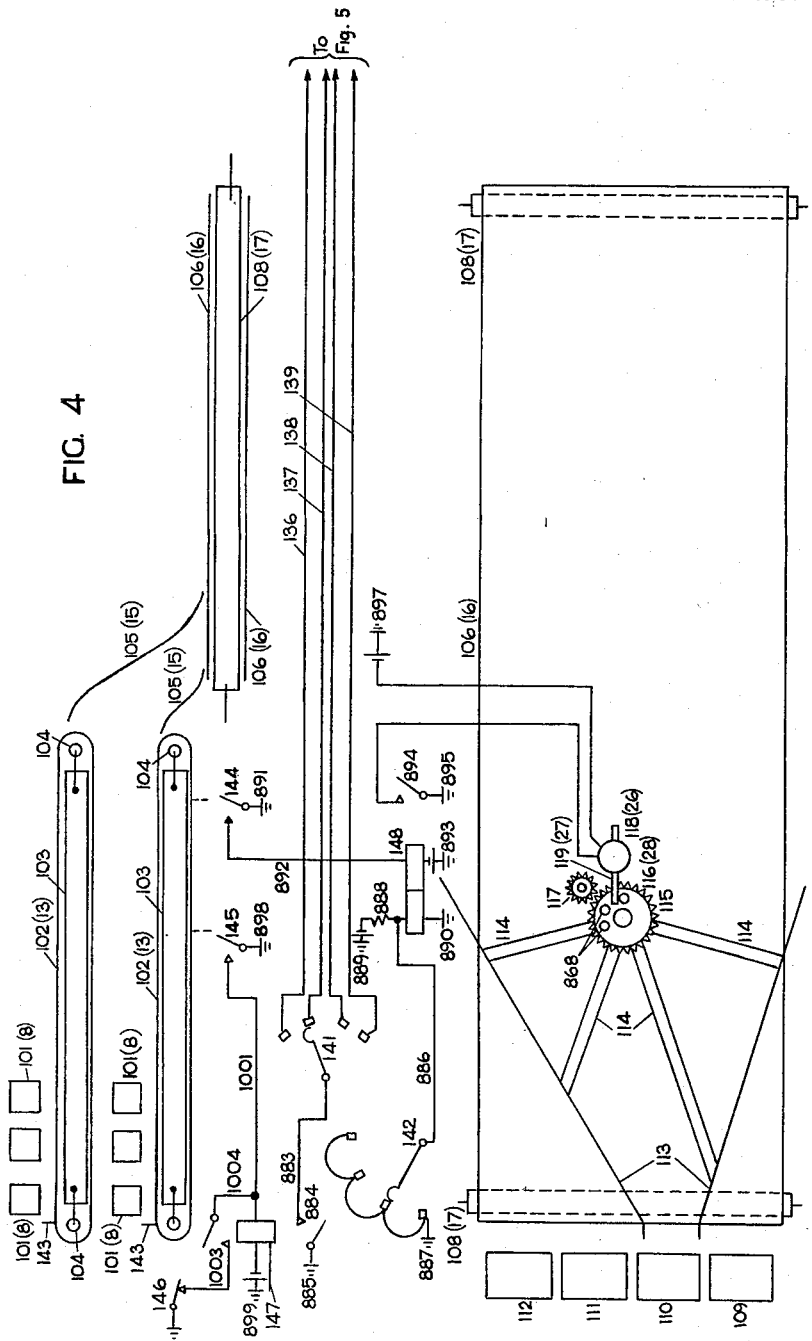

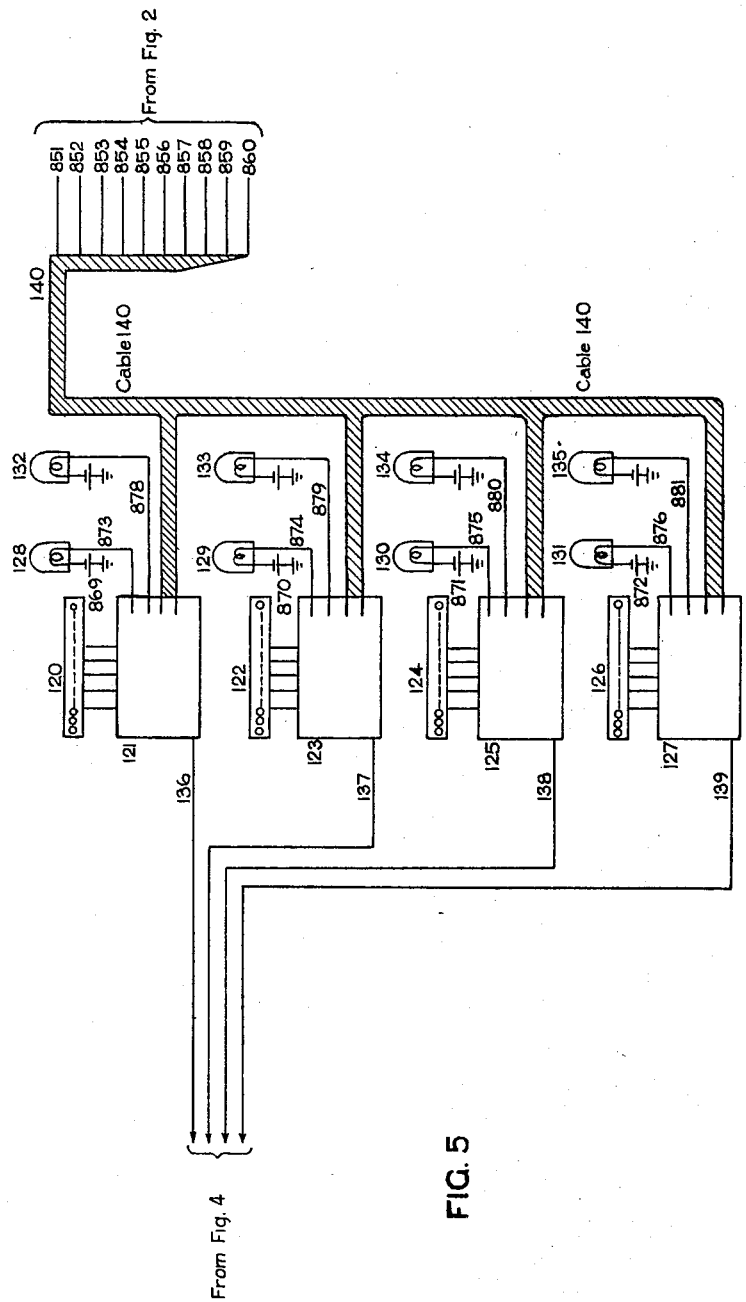

Patented Feb. 10, 1953

2,627,941

UNITED STATES PATENT OFFICE 2,627,941

STOCK DISTRIBUTING SYSTEM

Thomas Samuel Skillman, Mosman, near Sydney, New South Wales, Australia, assignor to Punch Engineering Pty. Limited, Cammeray, near Sydney, New South Wales, Australia, a company of New South Wales Application January 28, 1946, Serial No. 643,945
In Australia February 24, 1945

4 Claims. (Cl. 186—1)

This invention pertains to apparatus for selectively dispensing articles of varied character.

It is an object of the invention to provide means whereby required quantities of different kinds of articles such as those constituting the stock of a shop or store may be automatically or semi-automatically dispensed from shelves or bins upon or in which they have been stacked or otherwise pre-arranged or grouped.

According to one feature of the invention each kind of article in the stock is allotted some characteristic code which identifies it, such as a sequence or combination of digits or letters or both, and when this kind of article is required, keys or other electrical contacts are operated in accordance with this code to selectively establish an electrical circuit which thereupon operates a storage and releasing device for the required kind of article and causes the required quantity thereof to be released from the storage position on to a conveying or distributing mechanism by which it is delivered to a receptacle, wrapping counter or other desired destination. Each of said storage and releasing devices comprises a movable member on which said articles stand or lie, and means operated by said electrical circuit to move the movable member so that each article, in turn, is brought into a position where it moves away from the remaining articles by the action of gravity. In this manner selections of required articles from a very large number of different kinds of articles can be rapidly assembled and the usual process whereby storemen or shop assistants walk around and collect articles from shelves or bins is eliminated.

According to a further feature of the invention the stock is located in a position remote from the operating devices, whereby the use of expensive shop front space for storage is avoided. In one embodiment of the invention a small fronted shop contains the operate and delivery positions of the apparatus and the goods are automatically delivered by conveyors from storage facilities located at a remote point, such as a storeroom in the rear or on an upper floor, where storage costs are much less.

According to a further feature of the invention the release of each kind of article on to the conveyor system is effected by means of a magnetic clutch, individual to the storage bin of the kind of article. The said clutch is selectively energisable as part of said electrical circuit and causes a continuously moving member, such as a rotating shaft, to move the articles forward so that the foremost article topples under the action of gravity on to the conveying system. During its fall each article operates an electrical contact mechanism which de-energises said magnetic clutch and thus arrests the forward movement of the articles.

Further features of the invention relating to the provision of alarm facilities, cancelling facilities and so on are disclosed in the description given below and the following drawings of one particular embodiment of the invention and in the associated claims.

Figure 1:
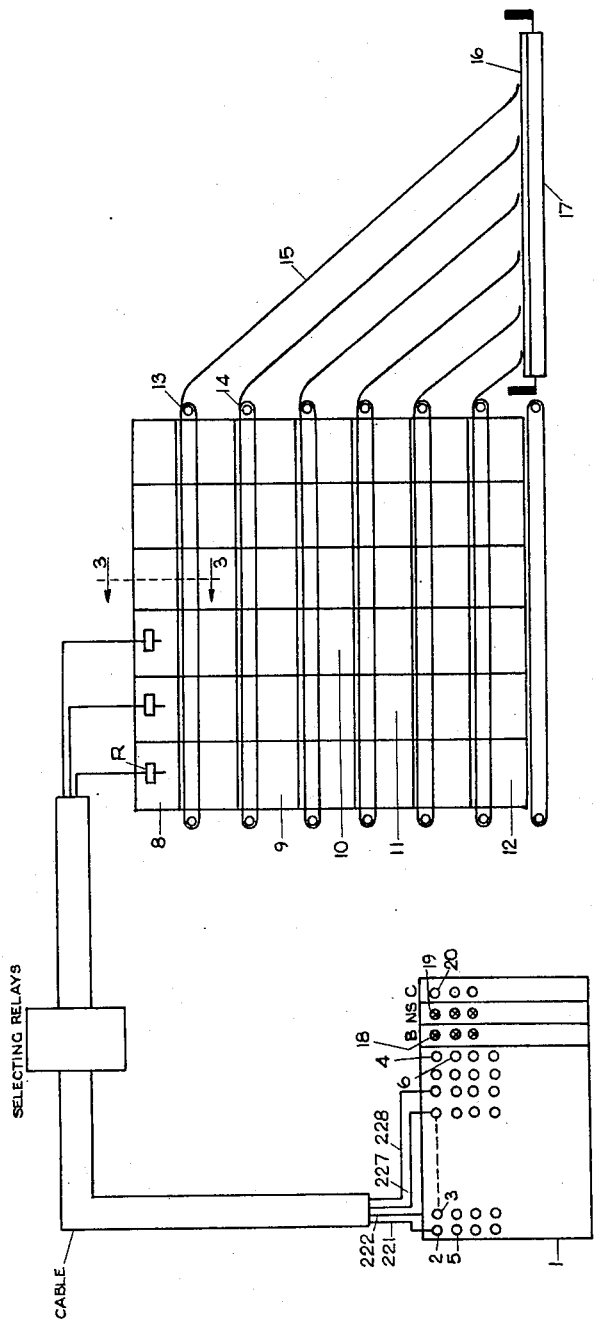
Figure 1 shows diagrammatically in front elevation, the layout of one group of the storage bins, and the appurtenant conveyor belts and chutes for conveying the dispensed articles to a common delivery point, this figure also showing in plan view, the keyset for code selection of the articles to be dispensed.

Figure 3 is an enlarged sectional elevation in more or less diagrammatic form, taken substantially at 3—3 of Figure 1 through one of the storage bins, illustrating the arrangement employed for storing and dispensing the articles from the bins, this view also showing certain of the electrical connections involved, including the electrical contact or trip mechanisms actuable by the dispensed articles, for de-energising the magnetic clutches.

Figure 4 illustrates more or less diagrammatically, and in circuit diagram form, a mechanism in accordance with the invention for discharging dispensed articles into a plurality of delivery receptacles, progressively and in accordance with orders placed by different customers, i. e., a different receptacle for each such customer's order.

Figure 5 illustrates more or less diagrammatically, a circuit arrangement employing multiple keysets and/or registers, whereby different operators may place orders for different customers.

Considerd first Figure 1. The system shown therein consists of an operator's position, a selecting relay group and a shelf arrangement which contains the necessary mechanism for the dispensing of the articles together with conveyor means to transport the articles to the wanted localities. A code or number storage register and a recording and printing device can be added if required. As the link between the operator's position and the shelf storage arrangement of the articles to be dispensed is only electrical, this shelf arrangement can be separately placed from the operator's position and thus, for example, the operator's position can be located on the ground floor of a shop, while the storage arrangement itself is located at an upper floor, an adjacent building or in any other locality. In this case the selected articles are transported to the shop by suitable conveying means.

Furthermore, it is possible to locate the stock in a central store and to transfer orders from outlying offices to the store where they can be picked up after completion.

The stock numbers in the latter case can be transmitted by any known method of code or number transmission.

The operator's position can be manned by a shop assistant, or the customer himself may operate the mechanism to release his own goods.

At the operator's position is a keyset 1, consisting of a number of rows of keys 2, 3 . . . 4:5 . . . 6: etc. Each row is numbered 1, 2 . . . 9, 0, and is associated with a number of groups of stock bins; one such group 8, 9, 10, 11, 12 etc., is associated with the first row of keys 2, 3 . . . 4 as is shown in the figure. The different articles constituting the stock are pre-arranged so that only one kind of article appears in each bin.

Associated with each stock bin is a release mechanism shown diagrammatically in Figure 1 as a magnet R. The bins are represented in Figure 1 by squares such as square 8, 9, 10, 11, 12, etc. Associated with each horizontal row of bins is a travelling belt 13, 14, etc.

The operator receives the stock list giving the stock number of each of the articles required and the quantity of each. On the keyset she keys up the number representing one of the required articles and thereby operates the release mechanism associated with the corresponding bin, such as mechanism R Figure 1. The articles are released, as described later on in connection with Figure 3, fall out upon the travelling belt 13, and after reaching the end of this belt, travel down the chute 15 and fall upon a further travelling belt 16 travelling over roller 17. The travelling belt carries the goods through to the receptacle awaiting them.

The stock number consists of a preliminary digit or letter, telling the operator which row of keys to select followed by two further digits representing the particular bin in the particular group of 100 bins chosen by the preliminary digit. These latter two digits are punched by the operator in succession on the selected row of keys. Throughout the following description these latter two digits are referred to as "first" and "second" digits.

Figure 2:
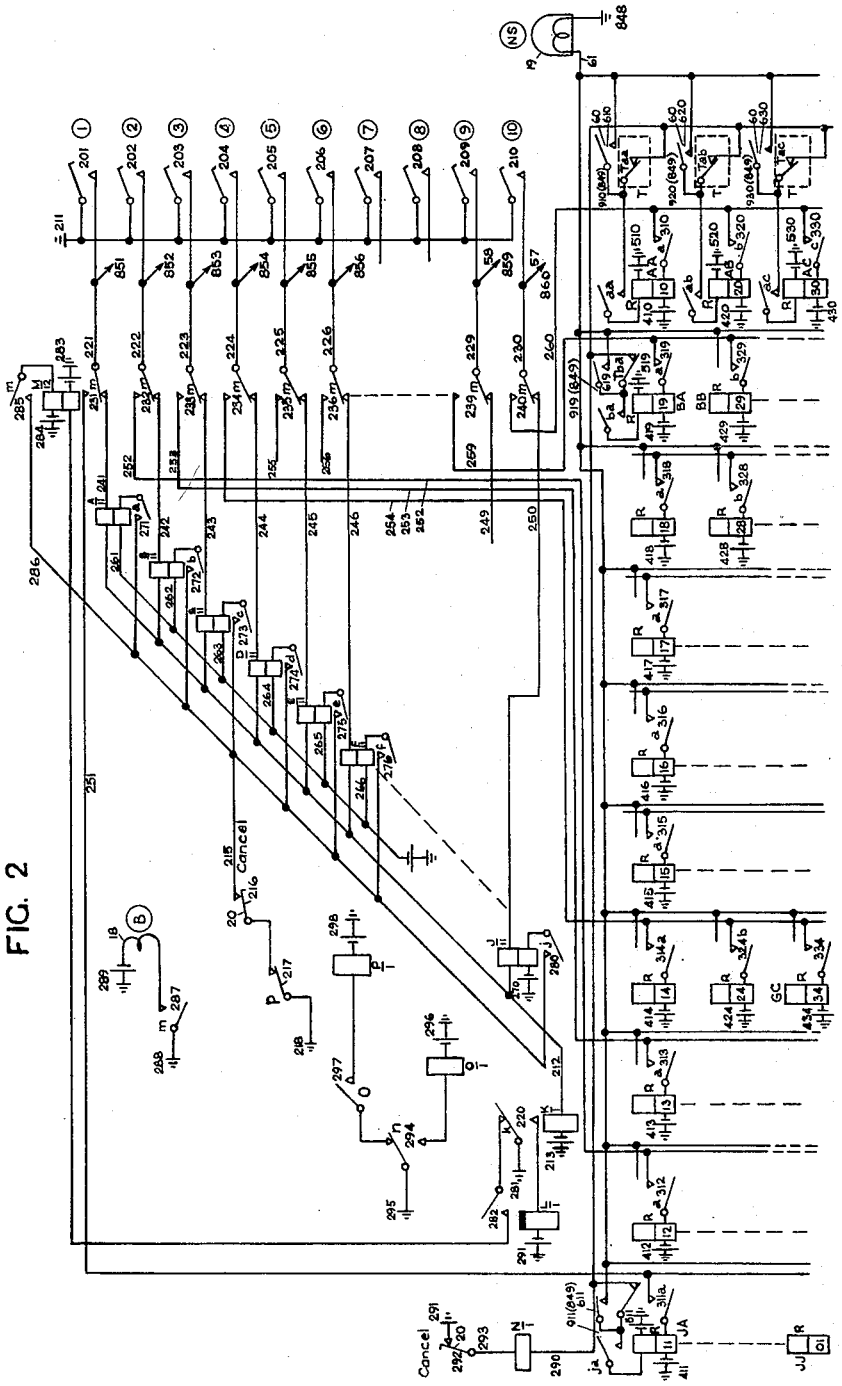
Figure 2 is a circuit diagram of the electrical circuits controlled by the keyset for selectively actuating the magnetic clutches aforesaid for dispensing a selected kind of article.

Figure 2 shows the electrical circuit used to operate the various release mechanisms operable from one of the several rows of keys 2, 3 . . . 4: 5 . . . 6: etc. in Figure 1. Identical circuits enable other rows of keys to operate corresponding sets of release mechanisms. In Figure 2 the particular rows of keys considered is represented by the row of ten contacts 201 to 210 inclusive (each labelled with one of the ten digits "1" to "0" as shown in the circles near the respective contacts), and the particular release mechanisms are represented by the one hundred magnets AA, AB, AC, etc. BA, BB, etc. down to JA, JJ. The final portion (last two digits—see below) of the stock number corresponding to each mechanism is shown on the drawing inside the rectangle portraying the corresponding one of the magnets AA to JJ inclusive. To avoid too complicated a figure, the circuits for all bins and keys have not been drawn. Where dotted lines or incompleted circuits are drawn it is to be understood that the circuit of AA or JA would, in practice, be reproduced exactly for the corresponding magnets in the other positions, except of course that the operating lead for each vertical row of magnets goes as shown to a different front contact of relay M. The lead 260 for example is the operating lead for the vertical row of magnets AA, AB, AC, . . . etc., and is taken from these magnets to the particular front contact of the contact set 240 of relay M which upon operation of relay M becomes connected to the key 210 labelled "0." All contacts of the relay M are marked $m$ in accordance with the "detached contact" method of showing relay and key contacts, which method is employed in Figure 2. The rectangle designating the relay magnet is labelled $$\frac{M}{12}$$

the numeral "12" used in this way indicating that there are in total twelve contacts on the relay M. Key contacts are distinguished from relay contacts by a short line or "flag" on the end of the moving contact, and the designation of the key is shown against the contacts. All contacts of both keys and relays are drawn in the unoperated condition. Contacts $aa$, $ab$, etc. represent electrical contacts one of which is operated when the corresponding release mechanism is energised. Thus when the magnet AA is energised (in response to a stock number whose final portion is "10" as will be described later on), the contact $aa$ is operated; and when AC is energised, the contact $ac$ is operated. Contacts $Taa$, $Tab$, etc. are momentarily operable by released articles, each being opened for a brief period each time that one of the corresponding articles has been released (contact 25 in Figure 3 shows one method whereby this is achieved).

A lead 211 is taken to earth from each of the respective moving contacts of the ten keys 201 to 210 inclusive and labelled "1" to "9" and "0" respectively. From each of the front contacts of these keys a lead is taken to the moving arm of the corresponding one of the first ten of the twelve contact sets of the relay M. The ten leads are labelled 221 to 230 respectively, and the ten contact sets are labelled 231 to 240 respectively. From the respective back contacts of these ten contact sets 231 to 240 inclusive, a lead is taken in each case to one winding of the corresponding one of the ten relays A to J inclusive. The latter leads, ten in number, are labelled 241 to 250 inclusive. The other terminals of these ten windings of the relays A to J are connected together by the lead 212 by which they are also connected to one terminal of the winding of the relay K. The other terminal of the latter winding is connected to battery at 213. Each of the ten relays A to J inclusive has a second winding one terminal of which is connected to battery at the corresponding one of the points 261 to 270 inclusive. The relays A to J inclusive each have eleven contact sets, the eleventh contact sets being labelled 271 to 280 respectively. The second terminal of the second winding above-mentioned for each of the relays A to J inclusive, is connected to the moving contact of the corresponding eleventh contact set (that is one of 271 to 280 inclusive): thus the second winding of the relay C is connected to battery at 263 and to the moving contact of 273 the eleventh contact set of the C relay. All ten of the front contacts of these eleventh contact sets 271 to 280 inclusive of the relays A to J are connected together by the lead 214 and from this common point a lead 215 is taken to the back contact of the contact set 216 of the "cancel" key. The moving arm of the contact set 216 is connected to the back contact of 217 of the P relay, and the moving arm of 217 is connected to earth at 218.

A connection is taken from battery at 219 to the winding of the L relay, the other terminal of this winding being taken to the front contact of 220 the single contact set of the K relay abovementioned. The relay L has a slower release characteristic than the K relay. The moving contact of 220 is taken to earth at 281; and the back contact of 220 is connected to the moving contact of 282 the single contact set of the L relay. The front contact of 282 is connected to a terminal of one winding of the M relay the other terminal of this winding being connected to battery at 283. The relay M has a second winding one terminal of which is connected to battery at 284, and the other terminal of which is connected to the moving arm of 285 the eleventh contact set of the M relay. The front contact of 285 is connected via the lead 286 and the lead 215 to the back contact of 216 of the "cancel" key.

The twelfth contact set of the relay M is labelled 287 and is connected to complete upon operation of the M relay, a circuit between earth at 288 on the moving arm and battery at 289 over the lamp 18 and the front contact of 287.

A set of ten leads 251 to 260 inclusive is taken from the respective front contacts of 231 to 240 inclusive the first ten contact sets of the M relay. Each of the ten leads 251 to 260 inclusive is taken to the corresponding one of the ten vertical columns of magnets representing the release mechanisms R. Thus the lead 260 is taken from the front contact of 240 to the vertical columns of magnets AA, AB, AC etc., representing the release mechanisms in this particular hundred line group the final parts of whose stock numbers are respectively "10," "20," "30," etc. A similar lead 259 is taken from the front contact of 239 to the vertical column BA, BB, etc. In actual detail, the lead 260 is connected at the release mechanism end to the ten front contacts of the sets 310, 320, ..., 390, 300 inclusive, these front contacts being connected together. The latter contact sets in each case are the tenth contact sets of the ten relays A to J inclusive. The first ten contact sets of the A relay are those labelled 311, 312, ..., 318, 319, 310; the first ten contact sets of the B relay are those labelled 321, 322, ..., 328, 329, 320; and similarly up to those for the relay J which are those labelled 301, 302, ..., 308, 309, 300. Again, in actual detail, the lead 259 to the vertical column BA, BB, BC, etc., is there taken to the ten front contacts of the sets 319, 329, ..., 399, 309 inclusive.

The one hundred moving arms of the first to tenth contact sets of the A to J relays (i. e., 311, ..., 319, 310; 321, ..., 329, 320; ...; 391, ..., 399, 390; 301, ..., 309, 300) are connected each to a terminal of a first winding on the respective ones of the one hundred magnets AA, AB, AC, etc., BA, BB, etc.; and the other terminal of each of these first windings is connected to battery, respective battery connections being 411, ..., 419, 410; 421, ..., 429, 420; ...; 491, ..., 499, 490; 401, ..., 409, 400. The one hundred magnets AA, AB, AC, etc., BA, BB, etc., have second windings, and one terminal of each second winding is connected to battery, the respective connections being 511, ..., 519, 510; 521, ..., 529, 520; ...; 591, ..., 599, 590; 501, ..., 509, 500. The one hundred magnets AA, AB, AC, etc., BA, BB, etc., have each a single contact set, the moving arm of which is connected to the second terminal of the second winding of the corresponding relay. Thus the moving arm of the contact set aa of the AA magnet is connected to the second terminal of the winding of which the first-mentioned terminal is connected to battery at 510. The front contact of the set aa is connected to the moving arm of the contact set Taa and also to the moving arm of the contact set 610 the corresponding one of the "bin empty" contacts 60 referred to later on. Corresponding connections are made from contacts of the other release mechanism magnets to the moving arms of corresponding "T" contact sets and of corresponding contact sets 60. The one hundred back contacts of the trip contacts Taa, Tab, Tac, etc., Tba, Tbb, etc., are connected together and via the lead 290 this common trip contact connection is taken to one terminal of the winding of the N relay. The other terminal of the winding of the N relay is taken to earth at 291 via the contact set 292 of the "cancel" key and via the lead 293.

The N relay has only one contact set 294 the moving contact of which is connected to earth at 295. The front contact of 294 is connected to one terminal of the winding of the O relay. The other terminal of this winding is connected to battery at 296. The O relay has only one contact set 297 the moving arm of which is connected to the back contact of 294 and the front contact of which is taken to one terminal of the winding of the P relay. The other terminal of the latter winding is connected to battery at 298.

The one hundred front contacts 60 (namely the front contacts of 611, ..., 619, 610; 621, ..., 629, 620; ...; 691, ..., 699, 690; 601, ..., 609, 600) are connected together to one terminal of the lamp 19 which is labelled "NS." The other terminal of the lamp 19 is connected to earth at 700. For completeness in showing the keys, various further key contacts are shown in Figure 2 as well as various other leads to other apparatus in the system. These, however, do not affect the circuits as such which connect the ten keys to the one hundred releasing mechanisms, and they will therefore be referred to when describing other parts of the system shown in other figures of the drawings.

One row of keys labelled 1 to 0 is shown in Figure 2. When one of these keys is depressed the first time, it operates one of the ten relays A to J corresponding to the first digit (after the preliminary digit) of the stock number. When the key is operated a second time one of the release mechanisms is operated. A "busy" lamp 18 in Figure 2 and marked "B" is provided and lights as soon as the operator keys up the stock number. It goes out again as soon as the stock item has fallen out on to the travelling band thereby telling the operator that she may key up another number. This "busy" lamp 18 is shown on the keyboard 1 appearing in Figure 1. As stated above, further sets of keys such as 5 ... 6 shown in Figure 1 are provided for other groups of bins, and each such set of keys has a "busy" lamp. The latter lamps are shown in Figure 1 as the vertical column of lamps B headed by the lamp 18. Thus while a number from the first group of bins is being released and the "busy" lamp is lit, the operator can key up a number in any of the other groups. Generally, she can key up the numbers with her left hand while ticking off the list with her right hand.

If no stock of some particular kind of article is available, an alarm contact is closed on the relevant bin; and in such cases the "no stock" alarm 19, marked "NS" lights up whenever the operator keys up the stock number of that particular kind of article. She then presses a cancel key 20, and proceeds to the next item. The alarm contacts 60 which serve as above-mentioned to light up the lamp 19, are represented in Figure 2 by the numerals 60 and in addition are labelled 611, 612, ..., 619, 610; 621, 622, ..., 620; ...; 691, ..., 699, 690; 601, ..., 609, 600. One such contact is provided on each bin, and the form which the contact takes will be described later on.

The detailed operation of Figure 2 may be best followed by considering the release of one item, say stock item 20. When the operator presses the key marked 2 the first time, this operates relay B which then locks over the back contact of relay P. The operating circuit for the relay B is completed by the closing of the contact set 202 and can be traced through, starting from the lead from earth at 211 to the moving arm of the key contact set 202; thence via the front contact of 202 the circuit can be traced via the wire 222 to the moving arm of the contact set 232 of the M relay; from the moving arm the circuit continues via the back contact, with which the moving arm is then in contact, then via the wire 242 to one terminal of the B relay. From the other terminal of the same winding of the B relay, the circuit continues via the lead 212 through the coil of the K relay to battery at 213 and thence back again to earth, thus completing the circuit. The holding circuit of relay B can be traced in Figure 2 from battery at 261 to a terminal of the second coil of B; and from the other terminal of this second coil to the moving arm of the contact set 272 of the B relay. The B relay being operated, the holding circuit is therefore extended through from the front contact of 272 via the lead 215 to the back contact of 216, a contact set of the "cancel" key 20, then via the moving arm of 216 to the back contact of 217 a contact set of the P relay. The P relay being unoperated, this holding circuit continues through the moving arm of 217 to earth at 218 whence the holding circuit is continued through battery to the start. At the same time relay K is operated and operates relay L. The circuit for the relay K is the same as that traced above for the relay B. The circuit for the relay L is traceable from earth at 281 to the moving contact of 220 the contact set of the K relay. The latter being operated, earth at 281 is therefore connected via the front contact of 220 to one terminal of the coil of the L relay. The circuit continues via the coil to battery at 219 and so back again to earth. When the operator releases the key marked 2 the first time, relay K releases due to the interruption of the circuit thereof at 202, but relay L remains momentarily energised. A momentary circuit is thus established from earth at 281, over the back contact of 220 the contact set of K, front contact of 282 the contact set of L to battery at 283 to energise M. Relay M locks up over the circuit which commences at battery at 284, and, after traversing the second winding of relay M, through the lead 286 to 215 part of the same circuit as holds relay B operated and thus the release of the contacts 202 after being closed the first time changes over the key leads. The leads are 221, 222, ... 229, and 230 which are connected to the contact sets 231, 232, ... 239 and 240 respectively of the M relay. By the operation of M, these leads 221, 222, ... 229 and 230 are connected temporarily to the leads 251, 252, ... 259 and 260.

The second operation of the keyset (in this case the contacts 210 of the key labelled "0" are closed representing the second digit of the stock number of the wanted kind of article namely 0) closes a circuit over the front contact of relay M and the make contact of relay B to the winding AB thus operating the release mechanism. The circuit in detail is as follows. From earth at 211 at the keyset the operating circuit for the magnet AB extends via the moving and front contacts of the keyset contacts 210 onto the lead 230 to the moving arm of the contact set 240 of the M relay. This relay being in the operated condition when the keyset is being operated for the second digit, the circuit extends via the front contact of the set 240 onto the lead 260. The circuit can now be traced to the set 320 one of the contact sets of the relay B. The latter relay being at this stage held in the operated condition after the release of the key 202, the circuit is extended to the moving contact of 320 and thus through one of the windings of the magnet AB to battery at 420 and thus back again to earth completing the operating circuit of magnet AB.

The magnet AB locks over its own contact ab and trip contact Tab and this also energises relay N. From earth via the battery at 520 the locking circuit extends to the second winding of the magnet AB; and after running through this second winding reaches the moving arm of the contact set ab. The magnet AB having been operated as just described, the contact set ab is in the operated condition thus extending the holding circuit to the front contact of the contact set ab, via which the holding circuit reaches the moving arm of the normally closed "trip contact" Tab, and via the back contact thereof reaches the lead 290 connecting the one hundred back contacts T to the winding of the N relay. From the other terminal of the winding of the N relay the holding circuit of the magnet AB reaches the lead 293 connecting the N relay to the contact set 292 of the cancel key 20 via which contact set the circuit again reaches earth at 291. The holding circuit just traced for the magnet AB includes the coil of the relay N, and this relay is therefore energised as abovementioned by the holding current through the magnet AB. The operation of relay N energises relay O and thus prepares the circuit for relay P. The operating circuit for relay O extends from earth at 295 to the moving arm of 294 the contact set of the relay N. The latter being operated over the circuit traced above, the moving arm is in contact with the front contact of 294 thus extending the operating circuit to the winding of the relay O via which winding the circuit extends to battery at 296 and thence to earth once more. Prior to the operation of the N relay, a circuit extends from the front contact of 297 the contact set of the O relay to the winding of the P relay and through this winding to battery at 298. Through the battery via earth at 295 this circuit extends to the moving arm of 294 and via the back contact of 294 to the moving arm of 297. This circuit for the P relay is however at that stage incomplete due to the open contact at 297. The P relay cannot therefore operate due to the back and moving contacts of 295 being closed in the unoperated state of the relay N. When however the O relay has operated as described above, and the contacts closed at 297, the P relay still does not operate, since the circuit traced out above although closed at 297 is first broken at 294. This circuit is however, put into a condition (referred to as being "prepared") whereby subsequent release of the relay N will cause the operation of the relay P. This is possible by virtue of the fact that the contact set 297 is held actuated for a short time after the restoration of the contact set 294 by the release of the N relay. The P relay is thus at this stage "prepared," and is now ready to operate momentarily upon the subsequent release of the N relay. When the packet or other kind of wanted article falls on to the band such as 13, 14 etc. of Figure 1 as will be described in more detail later in connection with Figure 3, it opens the corresponding trip contact Tab momentarily in a manner described later, thus releasing relay N, operating relay P and thus, via the contact set 217 of relay P, releases relays B and M. Contact Tab also releases magnet AB. The momentary operation of the trip contact Tab thus restores all relays and magnets to the initial condition ready for further actuation of the keyset should another kind of article be wanted from the group of release mechanisms reached via the particular keyset.

It will be clear that if the operator had first pressed the key 2 as in the example described above, and had then pressed the key 9 instead of the key 0, relay BB would have been operated instead of relay AB, thus releasing stock item 29 instead of stock item 20; and similarly if the first digit had been 1 instead of 2 relay A would have been operated instead of relay B and the second digit would have operated one of the release mechanism magnets AA, BA, etc.

Turning now to Figure 3: This shows a crosssection of one of the bins, the front end of which is shown in Figure 1. The particular crosssection shown in Figure 3 is indicated on Figure 1 by the section arrows labelled 3—3. Each bin is filled with articles of the particular stock item concerned, represented in Figure 3 by the packages 21, 22 etc. To avoid too great complication in Figure 1, these packages 21, 22, etc., have not been shown therein; but had the packages been shown, then 21 would be seen through the rectangular open end of the bin seen in section in Figure 3. The other packages 22 etc. seen standing to the right of 21 in Figure 3 would not be seen in Figure 1, these being in positions where they would be hidden behind 21. The travelling band 13 is the same as that shown in Figure 1 with the same designation. This band runs continuously. The travelling band 23, however, is normally stationary and is only brought into action by operation of the release mechanism as will be explained shortly. The band 23 is not represented in Figure 1, for the same reason that prompted the omission of the packages abovementioned. When the release mechanism R is actuated by the appropriate one of the magnets AA to JJ when energised as described above in connection with Figure 2, then the band 23 commences to move forward slowly until the foremost package 21 overbalances and falls on to the travelling band 13. In doing so, it knocks lever 24 of the corresponding trip contact device T and this operates contacts 25 the corresponding one of the one hundred sets of contacts Taa, Tab, etc. of Figure 2.

The corresponding one of the one hundred release mechanism magnets AA etc. of Figure 2 is shown to the right of Figure 3 and is there represented as the magnet bobbin 26, armature associated with which is the whole or a part of the clutch lever 27. No detailed magnet and armature construction is shown in Figure 3, since the aspects of the invention shown therein do not depend in any way upon these details which are in any case well known per se. The free end of the clutch lever 27 is in contact with the flexible steel wheel 28, and a continuously rotating driving wheel 29 is carried on the shaft 30. Magnetically actuated clutch devices of this kind are known in the automatic telephony art, one such device being described in "Electrical Communication" for January 1925. The operation of the clutch device as here utilised is as follows. The spring 31 normally pulls armature 27 away from the magnet 26 as shown diagrammatically in Figure 3 and the pressure of spring 31 also flexes the toothed wheel 28 so that it does not engage with the continuously rotating wheel 29. When the magnet 26 is energised as described for example in connection with the magnet AB in Figure 2, the lever 27 is attracted towards the magnet 26, overcoming the force exerted by the spring 31, whereupon the wheel 28 springs into mesh with the wheel 29 and thus drives the belt 23 which passes over a pulley 701 which is rigidly fixed to the flexible wheel 28. The release of the magnet 26 is subsequently effected by contacts 25 in the manner already described. For example, see the description given above of the release of magnet AB by the trip contact Tab both of which are shown in Figure 2.

A release mechanism consisting of the magnet, armature, and flexible wheel is provided for each stock bin, but the permanently rotating shaft 30 runs up the rear face of the bin (opposite end to that shown in Figure 1) and drives all the bands in the one vertical row of bins. Many different arrangements are possible. One small electric motor is quite able to drive all the bands in an installation, particularly since each is required to move during only a proportion of the total time. Under the various traffic conditions met with in practice in an installation, the most economical arrangement can be worked out for driving several movable bands 23 from the one common driving means, each of course through its own separately actuable coupling clutch device.

A second set of contacts 62 is shown in Figure 3 and is actuated whenever the trip lever 24 is itself actuated by an article falling past it on to the band 13. The contacts 62 are used, if required, to operate a message register 63 of a type similar to that used in telephone practice. This message register is operated once each time a package or other article falls out from the movable band 23 on to the moving band 13, and thus indicates directly the number of packages or other articles issued from that particular bin. This counting facility by means of telephone type message registers can be installed on all bins from which articles are to be dispensed and in respect of which totals are desired. The facility can merely be omitted from other bins without causing any complications whatever.

The trip lever associated with each particular releasing mechanism such as for example the lever 24 operating the corresponding one of the one hundred contacts Taa etc. in Figure 2 (contact 25 in Figure 3) can be used also to operate contacts 39 and 40. These contacts can operate, for example, value recording means to record the price of a selected and released article as described in detail in my copending application Ser. No. 93,206, filed May 13, 1949.

In Figure 3, a trailer mechanism 54 is provided in each bin, which includes a contact set 844 the contacts of which are closed when no articles are under the trailing mechanism 54, but are opened by articles passing under 54. The moving arm of the contact set 844 is connected to earth at 845 while a lead 55 is connected to the back contact of 844. The other end of the lead 55 is joined to a lamp 56 and the lamp is connected to battery at 846. The trailer mechanism therefore closes the circuit for the lamp 56 via the lead 55 when the stock in the bin falls below a level predetermined by the position of the trailer arm. This lights the alarm lamp 56 and energises any other alarms required such as bells, to draw the attention of the stockman to the need to replenish this bin.

A second trailer mechanism 847 operates to close a contact set 60 associated therewith whenever there is a lock of articles under the trailing mechanism 847. The back contact of 60 is connected by a lead 61 to a lamp 19 shown in Figure 2. The lead 61 is seen from Figure 2 to be a lead which is made common to all the one hundred back contacts of the contacts 60 namely the contact sets 611, 612, . . . , 619, 610, 621, . . . , 629, 620; . . . ; 691, . . . , 699, 690; 601, . . . , 609, 600. Thus 610 back contact is connected by the lead 61 to the lamp 19, and 630 back contact is connected to the lamp by the same lead or an extension thereof. The other terminal of lamp 19 is connected to earth at 848. Reverting to Figure 3, the moving arm of the contact set 60 is connected to a lead 849. Unlike the lead 61, the lead 849 is not common, but each releasing mechanism or stock bin has a connection 849 independent of the others. In the case of the bin for stock item 10, the lead 849 of Figure 3 is in Figure 2 marked 910 in addition to 849 which is shown in brackets. For stock item 19, the lead 849 is marked 919. The trailer mechanism 847 is located at a place in the bin where the contact set 60 thereof will be held open if there is only one article available, but will be closed when the bin is completely empty. The trailer mechanism 847 therefore permits a "No stock" signal to be extended to the operator by lighting lamp 19. The circuit of this lamp, which is located near the row of ten keys controlling the one hundred stock items, is shown in Figure 2, where it will be seen that battery via the holding winding and locking contact of any energised magnet releasing mechanism such as AA will be applied to lead 61 if the corresponding contact 60 is closed. Thus if there is no stock left in the release mechanism controlled by magnet AA and whose stock number is 10, then the corresponding contact 60 namely 610 will be closed. No signal will be given at this stage. However, should the magnet AA be energised the holding circuit will be completed by the contact aa as described above. The result of this is that the common lead 290 from the T contacts to the relay N will assume a potential relative to earth, which potential will be extended via the lead 910, and the operated contact 610 to the common lead 61. The lamp 19 connected between this common lead 61 and earth at 848 therefore lights up without however shunting relay N sufficiently to prevent this relay from operating. The current in the lamp 19 is also insufficient to keep operated the magnet AA or like when the operator opens the contact set 292 of the "cancel" key in response to the "no stock" signal by the lamp 19. The actuation of the "cancel" key therefore releases the magnet AA, stops the travelling band 23 which was set moving to no purpose in the corresponding bin, and extinguishes the lamp 19, thus signalling to the operator that the equipment is ready for her to begin to key up the stock number of another wanted kind of article in the same one hundred line group.

Reverting to Figure 2, it will be clear that a number of operators can be employed, all operating on the same set of bins. The row of "multiplying" arrows 851 to 860 inclusive in Figure 2 shows where many groups of keys similar to that shown can be connected in from other operators' positions. The connections are made in a way which ensures that all the front contacts of the keys similarly labelled are connected together. All moving arms of all keys are connected to earth as at 211. Thus any of the keys labelled "2" would earth lead 222. With this arrangement, of course, operators can work only one at a time. Arrangements to overcome this limitation are discussed above.

It will be clear that many modifications can be made in the arrangement described above without departing from the spirit of the invention: for example, the key set can be used to operate a register of the kind used in automatic telephone systems, and the register can then control the various release mechanisms R. Such an arrangement is described in detail in my co-pending application Ser. No. 230,272, filed June 7, 1951. In this way, using a number of registers, many more than one releasing mechanism can be operated at the same time and the need for the "busy" lamp can be obviated: that is to say, the operator can key in a whole series of codes without waiting, and the registers take the place of the operators. Such a system is discussed below in connection with Figures 4 and 5 where the same conveyor mechanism handles a number of separate batches of articles each following the other in time. The operators would then be able to store a large number of requests for stock in the registers and the machine would feed them out in batches as the belts became free.

It will be recalled that when several operators are employed to dispense articles from the apparatus shown in Figure 2, the operators can only work one at a time. With the arrangement using registers it will be shown in connection with Figures 4 and 5 how several operators can work simultaneously to feed the requirements into the registers, just as in an automatic telephone system.

Other types of release mechanism could be used without departing from the spirit of the invention. The advantage of the moving band is of course that each unit is issued separately without any risk that a second unit may get by and without any pressure on the release mechanism due to the weight of the article. A positive operation of trip lever 24 is thus very easily achieved.

It should be noted that the stock numbers are so arranged in relation to the travelling band 13 and also in relation to the travelling band 17 that the lowest numbers are further away from the issuing end and the highest numbers nearer the issuing end. Since the list will normally start with the low numbers and go on to the higher numbers, this means that those bins furthest away from the issuing end will discharge their contents first on to the band. In this way the issue of the total batch at the end of the band will be expedited.

The setting up of the automatic mechanism has been described as being done by the operator. It should be understood that this operator may be the customer.

It will be clear that the relative positions of key set, delivery post and stock can vary in any way without departing from the spirit of the invention. For example, a key set and delivery receptacle can be located in a ground floor shop while the storage bins are located in a tenth floor storeroom or in a separate building behind the shop. Alternatively, the stock can be located in a central store, orders being transferred from outlying booking offices in different parts of the city. The stock numbers can be transmitted in the latter case by any known method of code or number transmission without departing from the spirit of the invention.

The arrangement described above can be used in connection with a coordinating device to direct articles selected from one or various control stations or operator's positions to corresponding delivery positions.

An example of such an arrangement is shown in Figs. 4 and 5.

Referring now to Fig. 4, the bins 101, when the release mechanisms associated therewith are operated, eject goods or other articles on to the travelling belts 102 as already described. The bins 101 are similar to the bins 8, 9, 10, 11, 12, etc., shown in Figure 1, and to the bin 8 further described in connection with Figure 3. In Figure 4, therefore, the numeral 8 is shown in brackets after the numeral 101, to indicate this similarity of the units. Again, the travelling belts 102 are, in all respects except one which will be referred to later on, similar to the travelling bands 13, 14, etc. shown in Figure 1 and shown again as 13 in Figure 3. The numeral 13 is used therefore in Figure 4 where it appears in brackets after the numeral 102. The same is done with other units of the equipment where similar to units already described. The supports for these belts 102 are indicated diagrammatically as 103 and the rollers driving the belts as 104. The belts discharge the goods or other articles on to the chutes 105 which are similar to chutes 15 shown in Figure 1 and thus to the main conveyor belt 106 which corresponds to 16 shown in Figure 1 and which in Figure 4 leads to the receptacles. The rollers for driving the main conveyor belt correspond to rollers 17 in Figure 1 and in Figure 4 are indicated as 108.

In this embodiment the system permits the goods or other articles to be directed to one of four receptacles, 109, 110, 111 and 112, this being done by means of guides 113 which are carried above the main conveyor belt just clearing it. These guides are held by means of supports 114, and can be turned to lead the goods or other articles to any one of the four bins 109 to 112, this being brought about by actuation of the mechanism shown in the centre of this drawing. This mechanism consists of a main axle, 115, which is held perpendicular to the plane of the belt 106, a continuously rotating shaft 117 driven by a motor, a clutch magnet 118, a clutch arm 119 and a flexible gear wheel 116. The clutch magnet 118 is similar to the magnet 26 shown in Figure 3, and the lever 119 which it actuates is similar to 27 and is similarly pivoted, etc. The flexible gear wheel 116 is similar to 28 shown in Figure 3, except for the presence of four holes 868 at equal radial distances from shaft 115 suitable to be engaged by a pin formed from the bent part of the clutch arm 119. When the clutch magnet 118 is operated the clutch arm 119 pulls this pin out of whichever one of the four holes 868 it then occupies and at the same time permits the wheel 116 to flex into contact with the gear wheel carried on the shaft 117 in the same manner as already described in connection with Fig. 3. In this way upon the magnet 118 being energised the guides 113 are moved until they point to the required receptacle. When this is brought about the clutch magnet 118 is de-energised, in a way which will be discussed later, and the pin on the clutch arm 119 drops into the corresponding one of the holes 868 thus locking the guides 113 in correct position.

In order to move from receptacle 112 to receptacle 119 the guides are not in the method shown moved in the reverse direction, but instead the whole mechanism continues to rotate until it reaches the position of 109. It will be clear that a reversing mechanism, with an extra clutch to connect the shaft with a second driving shaft going in the other direction or a second gear wheel on the existing shaft could be very easily arranged.

Turning now to Figure 5 the drawing shows four operators' positions, each equipped with a key set 120, 122, 124, 126, and an associated register 121, 123, 125, 127 as described in detail in my above mentioned copending application Serial No. 230,272. Green lamps 128, 129, 130, 131, each connected to one of the registers light when the corresponding register is free. The lamps are connected to battery at 869, 870, 871 and 872 respectively. The connections to the respective registers are by the lead 873, 874, 875 and 876. These latter leads are connected to the registers so that each lead is earthed over a contact set within the register which contact set is closed whenever the register is free and is open when the register is in use or has been seized. This will be referred to again later on.

The foregoing description of Fig. 2 shows a method or system in which earth applied selectively to 10 wires from a key set can be used to selectively operate 100 bin release mechanisms in accordance with the indications given by two successive impulses of earth each applied to one of these ten leads. In the arrangements described in connection with Figure 2 the two impulses were generated by two successive depressions of the keys by the operator. It is well known in the automatic telephone art to provide such a sequence of impulses of coded combinations from registers instead of direct from an operator.

In Fig. 5 ten leads 851, 852, ..., 859, 860 shown in the top right hand corner are brought out from the registers (the cable 140 contains these ten separate leads), and these leads, which are multiplied to all the registers as shown by the cable 140 receive earth from whichever one of the registers is then discharging exactly as if they were connected to the keyset of Fig. 2. These earths operate relays such as A-J, M and release mechanisms such as AA-JJ of Fig. 2. A plurality of groups of 10 leads such as 140 of Figure 6 will be provided from the registers when more than one group of one hundred bins has to be operated. Each such group of ten leads goes of course to a different group of one hundred bins.

The key set 129, of Figure 5, consists of keys which provide earth on one or more of five wires, a different combination of the five earths being used to indicate each digit in a manner well known in the automatic telephone art.

A second red lamp 132, 133, 134, 135 lights when the corresponding register is full and tells the operators if more than one has access to any one register that they must wait until part of the register is discharged before adding any more to the order. The wires 878, 879, 880, 881 connect the last mentioned lamps to the register and earth on one of these wires lights the lamp. The green lamp is lit as abovementioned by earth over wire 873 and the red lamp by earth over wire 878. When no registers are used these lamps can be operated directly by the coordinating device of Fig. 4 to indicate to an operator when the device will be in a proper position for her selection as set out below.

The wires 136, 137, 138, 139 cause the corresponding register to start the discharge when an earth appears from the main control mechanism. This earth is applied to lead 136 for example by the control mechanism only when the conveyor gear is clear and ready to take the goods to the correct receptacle. When the signal is received over one of the leads 136, 137, 138, 139 as will be explained later on the register places earth on the ten wires, in exactly the same way as the operator did in the case of Fig. 2. It will be observed that the ten leads 851, 852, ..., 859, 860 are multiple to all registers and lead to the same bin 101 no matter which register is operated. The whole delivering and conveying mechanism remains unchanged and the factor which determines which of the four registers operate and which receptacle receives the goods is the position of the guides 113 and their associated gear shown in Fig. 4.

On the axle 115 or on a separate axle coupled in some way with axle 115 are carried two switches 141 and 142. 141 is used to indicate to the registers that they may start to discharge. 142 is used to centre the guide 113 (some interlocking mechanism associating 141 and 142 could be provided but is not shown in the diagram, since for most purposes the timing sequence which is described below will be sufficient protection). The switch 141 has an arm which wipes over four segments each connected to one of the wires 136, 137, 138, 139. The wiper 141 is connected by the lead 883 to the contact set 884 of relay 147 which contact set is connected to earth at 885. The switch 142 has likewise a wiper arm connected to the lead 886 and four narrow contact segments which are earthed at 887. The lead 886 is connected to the junction point of a resistor 888 and a winding of relay 148 the other end of which winding is earthed at 890. The resistor 888 is connected to battery at 889.

Attached to one of the conveyor belts 102 is a small dividing member 143 which serves the dual purpose of sweeping all the goods along to the chute and thus achieving a positive clearance of all those released within a certain time, and secondly, operating certain contacts 144, 145 and 146 placed at different positions along the band, and operated during the return of the member 143. Contact 144 is so spaced along the band that all the goods pushed down the chutes by the member 143 will have been delivered into the receptacles by the main conveyor belt 106 before the member 143 reaches contact 144. Contact 144 is earthed at 891 and by lead 892 is connected to the second winding of relay 148 the other end of which second winding is connected to battery at 893. Relay 148 has a contact 894 which is earthed at 895 and at 896 is connected to a terminal of magnet 118 the other terminal of which is connected to battery at 897. Contact 144 operates relay 148 over the circuit 891, 892, to 893 thereby operating the clutch magnet 118 over the circuit 895, 894, 896, 118 winding to 897 and causing the guides 113 to be moved on to the next receptacle. When the guides 113 are directly opposite the next receptacle, the arm of switch 142 will make contact with one of the four very narrow segments which are earthed in the manner already mentioned and this short circuits the winding of relay 148 in series with resistor 888, thus causing the relay to release, releasing clutch mechanism 118 and thus setting up the guides to the new receptacle. The resistance of 888 is such that the relay 148 will fail to operate over the circuit 889, 888 to 890, but will hold over the latter circuit until released by the switch 142 as just described. The clutch mechanism on its release enters the corresponding one of the holes 868 in the wheel 116 and thus any forces caused by the goods impinging on the guides will not be able to move the guide mechanism. While this movement is taking place the member 143 will continue to travel and will operate contact 145 thus operating relay 147 over the circuit from earth at 898, contact 145, lead 1001, winding 147 to battery at 899. Relay 147 locks over the circuit from earth at 1002, normally closed contact 146 whose function will be mentioned later, contact set 1003 of the relay 147, lead 1004, winding of 147 to earth via battery at 899. Relay 147 by its contact set 884 places earth on one of the start leads 136, 137, 138, 139 to the registers. The selected register then proceeds to function and the goods fall out of the bins on the conveyor belt. When the member 143 operates the contact 146 this releases relay 147, the register ceases to operate, no more goods are discharged, and the member 143 in a positive manner collects all those goods which have been discharged and delivers them to the receptacle. This sequence is then repeated for the next receptacle in the same way.

The contacts 144, 145, 146 will appear on only one conveyor belt in a group. The indications received from this one belt will be valid however for all other belts since these belts will be geared together.

It will be clear that the association of the member 143 with the band 102 is in no way essential and that a separate timing device to operate the contacts 144, 145 and 146 could be employed without departing from the spirit of the invention. Timing devices to operate contacts in this way are well known in the relay circuit and other allied arts.

It will be clear that the arrangement shown in Figures 2, 4 and 5 can be modified in many respects without departing from the spirit of the invention. There is a very big technique in the automatic telephone field for controlling registers and release mechanisms and any such technique can be regarded as applicable to the present idea without departing from the spirit of the invention. For example one key set could be used to set up any of a thousand or ten thousand numbers and thus control an unlimited number of bins by means of only one row of ten keys, using register principles well known in the art.

It will be clear that the nature of the conveyor mechanism can be changed in many ways without departing from the spirit of the invention. For example, the chutes 15 in Figure 1 can be replaced by travelling belts. Where breakable goods have to be carried, this would probably be necessary. Also the belts can carry ribs so that they are broken up into pockets to prevent goods rolling. Alternatively, the belts could consist of a series of trays or other receptacles linked together. Any method of conveying goods can clearly be employed once the articles have been ejected from the bins.

I claim:

1. A system for dispensing articles of varied character according to coded designations thereof, comprising: a plurality of storage and dispensing mechanisms, one for each code, said mechanisms extending in depth and being arranged in horizontal rows and vertical columns, each mechanism including a substantially horizontally disposed movable member for storing articles of the allotted code, and releasing means including electrically actuated driving means and coupling means individual to said movable members for selectively driving said members to dispense articles therefrom; first collecting means individual to each of said horizontal rows of storage and dispensing mechanisms to collect articles dispensed from any of said mechanisms of a corresponding row; second collecting means common to said first collecting means, and transfer means interposed between said first collecting means and said second collecting means to transfer articles from said first collecting means to said second collecting means and to transport said articles to a common delivery point; means including a power-actuated driving means common to said releasing means and selectively connectable by said coupling means to said first mentioned individual driving means; a selector device including a set of key-actuated contact members momentarily operable in accordance with the elements of the code allotted to any article; a selective switching arrangement including group selecting switching means to select a particular group of said storage and dispensing mechanisms corresponding to the first element of the code, and electrical connections from said switching means to said selector device and said releasing means, said selective switching arrangement being selectively responsive to successive momentary actuations of said contact members in accordance with the elements of the code of a wanted article for selecting firstly the electrical connections controlling individual groups of said coupling means and finally in a selected group the electrical connection to the coupling means associated with the storage and dispensing mechanism allotted said code; means to keep the coupling means in the operated condition after the release of said contact members; electrical contact devices individual to said storage and dispensing mechanisms and disposed for actuation at the discharge of each article therefrom, respectively, by the weight thereof; and means responsive to such actuation of any said contact device for de-energizing the corresponding electrically actuated coupling means to arrest the drive of the associated movable member.

2. A system for dispensing articles of varied character according to coded designations thereof, comprising: a plurality of storage and dispensing mechanisms, one for each code, said mechanisms being arranged in horizontal rows and vertical columns, each mechanism including a substantially horizontally disposed movable member for storing articles of the allotted code, and releasing means individual to said movable members for selectively dispensing articles therefrom; first collecting means individual to each of said horizontal rows of storage and dispensing mechanisms to collect articles dispensed from any of said mechanisms of a corresponding row; second collecting means common to said first collecting means, and transfer means interposed between said first collecting means and said second collecting means to transfer articles from said first collecting means to said second collecting means and to transport said articles to a common delivery point; means including a power-actuated driving means selectively connectable to said releasing means; a selector arrangement including a plurality of key sets, each set having ten key-actuated contact-members momentarily operable in accordance with the figures of the code allotted to any article, said key sets being electrically connected in multiple; means including indicating devices individual to said sets of key-actuated contact members; a selective switching arrangement including ten group selecting relays to select a particular group of said storage and dispensing mechanisms corresponding to the first figure of the code, and electrical connections from said relays to said key sets and said releasing means, said selective switching arrangement being selectively responsive to successive momentary actuations of the contact members of any of said key sets in accordance with the figures of the code of a wanted article for selecting firstly the electrical connections controlling individual groups of said releasing means and finally in a selected group the electrical connection to the releasing means associated with the storage and dispensing mechanism allotted said code; means to keep the releasing means in the operated condition after the release of said contact member; electrical contact devices associated with said storage and dispensing mechanisms and operable by each article dispensed therefrom to de-energise said releasing means; and means responsive to actuation of said selective switching arrangement for energising all said indicating devices during the actuation of any of said group selecting relays.

3. A system for dispensing articles of varied character, comprising: a plurality of storage and dispensing mechanisms, each mechanism including a movable member and driving means therefor for storing articles of the same character and for dispensing the same successively under gravity when moved, a pair of contact trailer devices disposed in spaced relationship in the direction of movement of said movable member and arranged for actuation by the stored articles as successively dispensed, one said device being released when the quantity of stored articles falls below a preselected amount and the other said device being released at the dispensing of the last article stored by said movable member; indicating devices individual to each said one trailer device actuated thereby upon the release thereof; a further indicating device common to all said other trailer devices and operable thereby; means including power-actuated driving means common to said movable members;

an electrically actuated coupling means individual to each said movable member for selectively driving the same to dispense said articles as aforesaid, and electrical connections from said coupling means to a corresponding other trailer device; further electrical connections from all said other trailer devices to said further indicating device, said indicating device being operable by any of said other trailer devices in their released position upon the operation of a corresponding coupling means; electrical contact means for selectively actuating any of said coupling means; electrical contact devices individual to said storage and dispensing mechanisms and disposed for actuation at the discharge of each article therefrom, respectively, by the weight thereof; and means responsive to such actuation of any said contact device for de-energising the corresponding electrically actuated coupling means to arrest the drive of the associated movable member.

4. A system for dispensing articles of varied character, comprising a plurality of storage and dispensing mechanisms, each including a substantially horizontally movable member for storing and successively dispensing said articles; collecting conveyor means common to said storage and dispensing mechanisms for collecting and conveying articles discharged from said movable members; a series of delivery positions to receive collected articles; a displaceable guide member associated with said collecting conveyor means for conveying said articles to any of said delivery positions; electrical switching means including electrical contact devices arranged in spaced relationship adjacent said collecting conveyor means and operable thereby, and electrical connections therefrom to said displaceable guide member for the operation thereof in a predetermined time sequence; means for selectively actuating the movable member of any of said storage and dispensing mechanisms, said means including a plurality of sets of electrical contact members electrically connected in multiple, each set being operable to select a wanted article from any said storage and dispensing mechanism and including supervising means operable to supervise the operation of said set; and control means associated with said displaceable guide member and operable thereby, and electrical connections therefrom to said supervising means to make the actuation of said movable members by said electrical contact members dependent on the positioning of said displaceable guide member.

THOMAS SAMUEL SKILLMAN.

REFERENCES CITED

The following references are of record in the file of this patent:

UNITED STATES PATENTS

| Number | Name | Date |
|---|---|---|
| 1,514,389 | McClellan | Nov. 4, 1924 |
| 1,602,753 | Davis | Oct. 12, 1926 |
| 1,645,694 | Esgro | Oct. 18, 1927 |
| 1,697,757 | Dahlstrom | Jan. 1, 1929 |
| 1,816,887 | Adams | Aug. 4, 1931 |
| 1,857,881 | Scott et al. | May 10, 1932 |
| 1,981,783 | De Bussey | Nov. 20, 1934 |
| 1,990,105 | Taylor | Feb. 5, 1935 |
| 2,023,574 | Cohn | Dec. 10, 1935 |
| 2,276,293 | Farmer | Mar. 17, 1942 |
| 2,276,294 | Farmer | Mar. 17, 1942 |
| 2,278,087 | McLaughlin et al. | Mar. 31, 1942 |
| 2,340,809 | Hatton et al. | Feb. 1, 1944 |
| 2,353,002 | Armbruster | July 4, 1944 |
| 2,351,432 | Jennings et al. | June 13, 1944 |
| 2,353,394 | Farmer | July 11, 1944 |
| 2,374,537 | Goldsmith | Apr. 24, 1945 |
| 2,432,324 | May | Dec. 9, 1947 |
| 2,500,437 | Tandler et al. | Mar. 14, 1950 |